US012220034B2

(12) United States Patent
Jeong et al.

(10) Patent No.: US 12,220,034 B2
(45) Date of Patent: Feb. 11, 2025

(54) HIGH-EFFICIENCY CORDLESS HAIR DRYER

(71) Applicant: FOUNDATION OF SOONGSIL UNIVERSITY-INDUSTRY COOPERATION, Seoul (KR)

(72) Inventors: Young Jin Jeong, Seoul (KR); Hyeon Jun Song, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 822 days.

(21) Appl. No.: 15/734,675

(22) PCT Filed: Feb. 5, 2020

(86) PCT No.: PCT/KR2020/001660
§ 371 (c)(1),
(2) Date: Dec. 3, 2020

(87) PCT Pub. No.: WO2021/112330
PCT Pub. Date: Jun. 10, 2021

(65) Prior Publication Data
US 2021/0169195 A1 Jun. 10, 2021

(30) Foreign Application Priority Data
Dec. 6, 2019 (KR) .......................... 10-2019-0161954

(51) Int. Cl.
*A45D 20/12* (2006.01)
*H01M 10/48* (2006.01)
(Continued)

(52) U.S. Cl.
CPC .......... *A45D 20/12* (2013.01); *H01M 10/482* (2013.01); *H01M 10/613* (2015.04);
(Continued)

(58) Field of Classification Search
CPC .. A45D 20/12; H01M 10/482; H01M 10/613; H01M 10/623; H01M 10/653;
(Continued)

(56) References Cited

U.S. PATENT DOCUMENTS 5,394,620 A * 3/1995 Chimera ................ A45D 20/10
34/97
5,884,008 A 3/1999 Goldberg
(Continued)

FOREIGN PATENT DOCUMENTS

CN 207133751 U 3/2018
CN 109922686 A 6/2019
(Continued)

OTHER PUBLICATIONS

Translation KR-20180036863-A, Apr. 2018 (Year: 2018).*
(Continued)

*Primary Examiner* — Jessica Yuen
(74) *Attorney, Agent, or Firm* — NSIP Law

(57) ABSTRACT

A high-efficiency cordless hair dryer according to an exemplary embodiment of the present invention may include: a main body housing having, at a rear side thereof, an air inlet port through which air is introduced, having, at a front side thereof, a discharge port through which the air is discharged, and having an internal space in which a heating element is mounted; and a power supply module configured to supply power and detachably coupled to the rear side of the main body housing at which the air inlet port is formed, in which the power supply module is detachably coupled to the main body housing so as to be coincident with a direction of a flow of air in the main body housing.

10 Claims, 6 Drawing Sheets

(51) Int. Cl.
  *H01M 10/613*  (2014.01)
  *H01M 10/623*  (2014.01)
  *H01M 10/653*  (2014.01)
  *H01M 10/6551* (2014.01)
  *H01M 50/213*  (2021.01)
  *H01M 50/247*  (2021.01)
  *H01M 50/264*  (2021.01)

(52) U.S. Cl.
  CPC ....... *H01M 10/623* (2015.04); *H01M 10/653* (2015.04); *H01M 10/6551* (2015.04); *H01M 50/213* (2021.01); *H01M 50/247* (2021.01); *H01M 50/264* (2021.01); *H01M 2220/30* (2013.01)

(58) Field of Classification Search
  CPC .......... H01M 10/6551; H01M 50/213; H01M 50/247; H01M 50/264; H01M 2220/30; H01M 10/6563; H01M 50/204; H01M 50/269; Y02E 60/10
  See application file for complete search history.

(56) References Cited

U.S. PATENT DOCUMENTS

| | | | | |
|---|---|---|---|---|
| 7,824,063 B2 * | 11/2010 | Frick | ................... | F21V 23/0414 |
| | | | | 362/208 |
| 8,146,264 B1 * | 4/2012 | Stefano | ................... | A45D 20/12 |
| | | | | 392/383 |
| 2018/0031318 A1 | 2/2018 | Goldman et al. | | |
| 2018/0233788 A1 * | 8/2018 | Goldman | .......... | H01M 10/6563 |

FOREIGN PATENT DOCUMENTS

| | | | | |
|---|---|---|---|---|
| CN | 110419843 A | | 11/2019 | |
| DE | 112011103795 T5 | * | 9/2013 | ............. B82Y 30/00 |
| EP | 2255692 A1 | * | 12/2010 | ............. A45D 20/12 |
| EP | 2390943 A1 | * | 11/2011 | .......... H01M 2/1072 |
| JP | 2005-510329 A | | 4/2005 | |
| KR | 20180036863 A | * | 4/2018 | |
| KR | 10-2019-0068720 A | | 6/2019 | |
| KR | 10-2019-0078521 A | | 7/2019 | |
| KR | 10-2019-0117859 A | | 10/2019 | |
| WO | WO 00/05540 | | 2/2000 | |
| WO | WO 00/05540 A1 | | 2/2000 | |
| WO | WO-2016072031 A1 | * | 5/2016 | ............. A45D 20/08 |

OTHER PUBLICATIONS

Translation DE-112011103795-T5, Sep. 2013 (Year: 2013).*
Translation, WO-2016072031-A1 (Year: 2016).*
Korean Office Action Issued on Jun. 19, 2020 in counterpart Korean Patent Application No. 10-2019-0161954 (4 pages in Korean).
Korean Notice of Allowance Issued on Oct. 14, 2020 in counterpart Korean Patent Application No. 10-2019-0161954 (2 pages in Korean).
International Search report issued on Sep. 21, 2019, in coutnerpart International Patent Application No. PCT/KR2020/001660 (3 pages in Korean).
Extended European search report issued on Jan. 25, 2022, in counterpart European Patent Application No. 20807646.3 (7 pages).
Chinese Office Action issued on Nov. 28, 2023, in counterpart Chinese Patent Application No. 202080003346.0 (8 pages in English, 8 pages in Chinese).
European Office Action issued on Apr. 16, 2024, in counterpart European Patent Application No. 20807646.3 (8 pages).

* cited by examiner

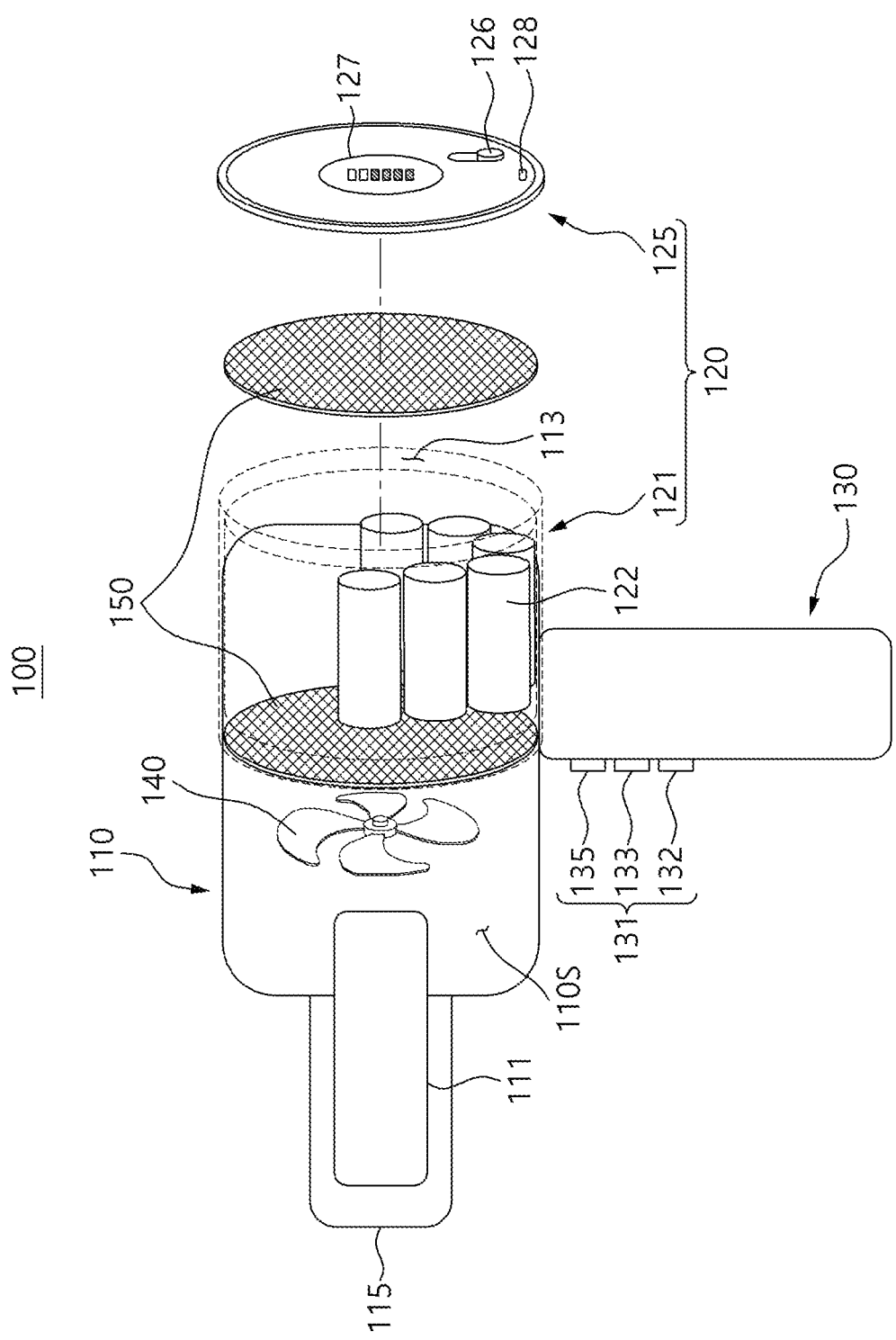
[FIG. 1]

[FIG. 2]
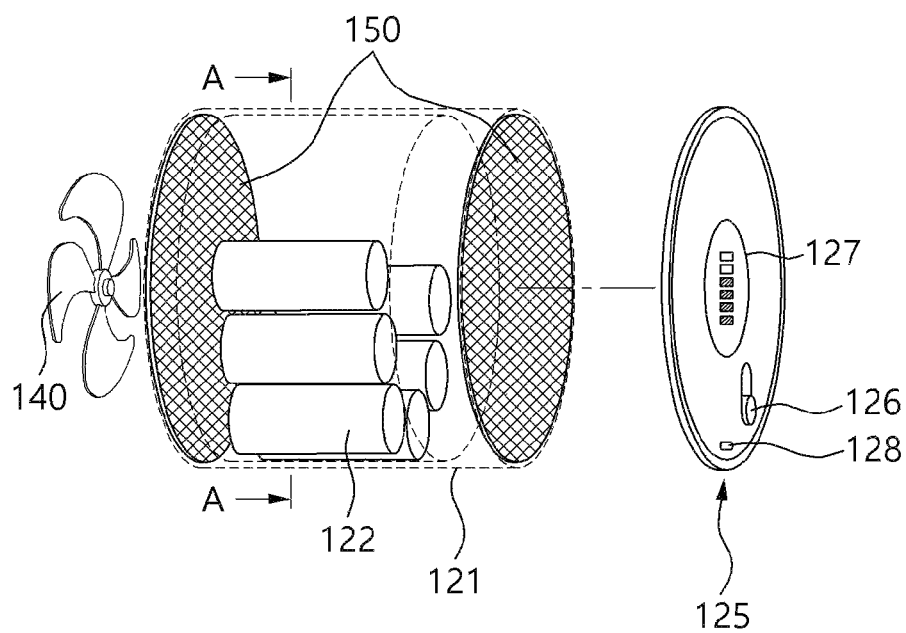
[FIG. 3]
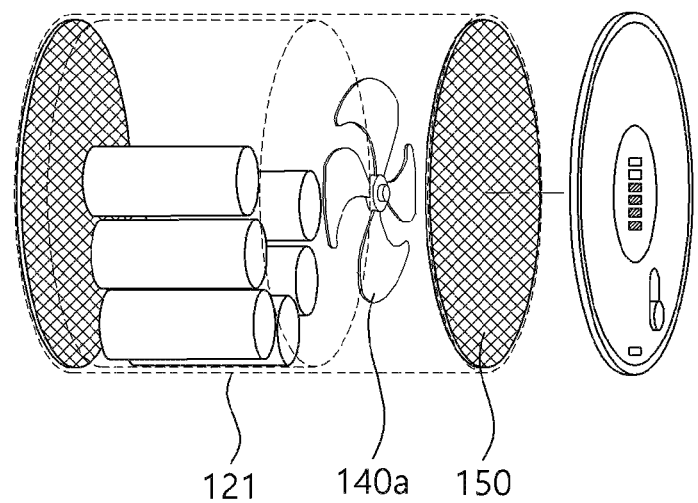

[FIG. 4]
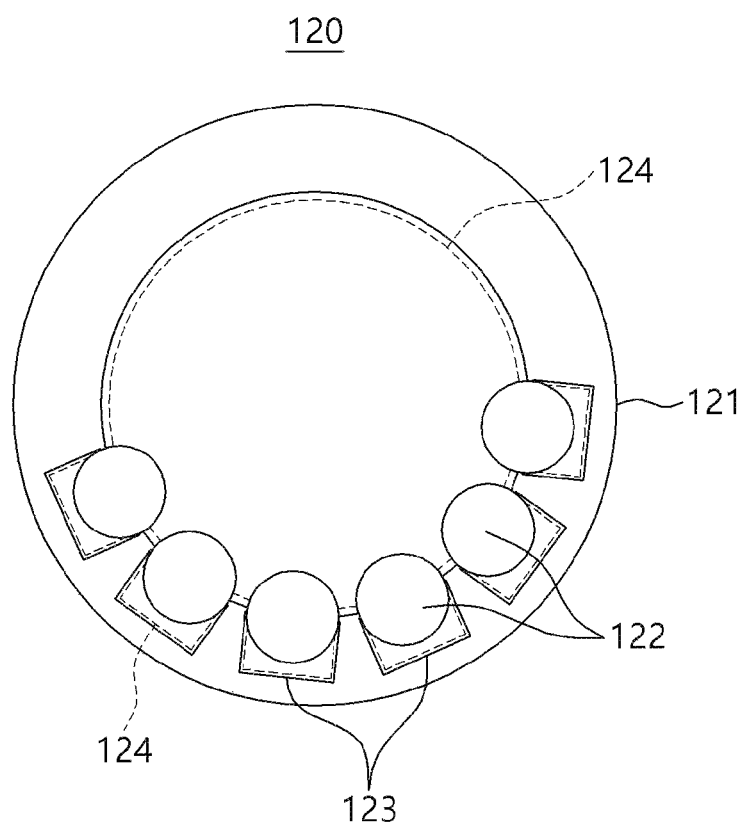

[FIG. 5]
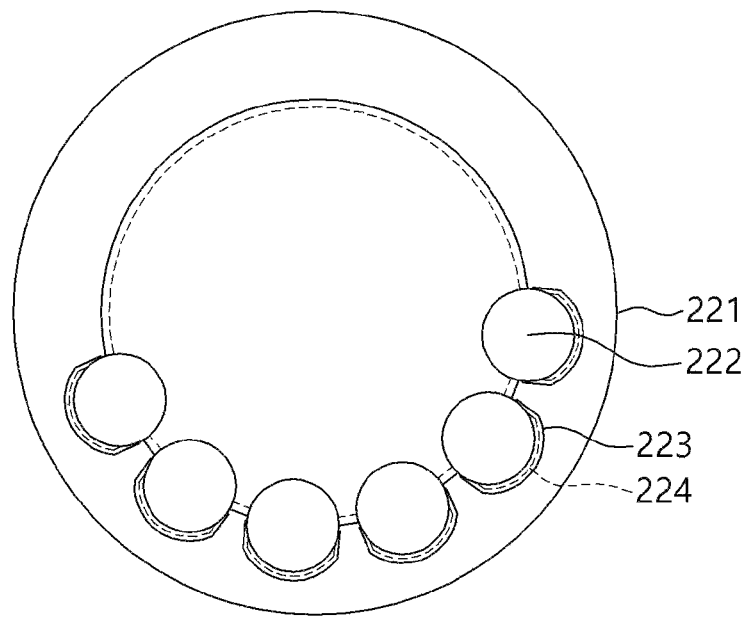

[FIG. 6]
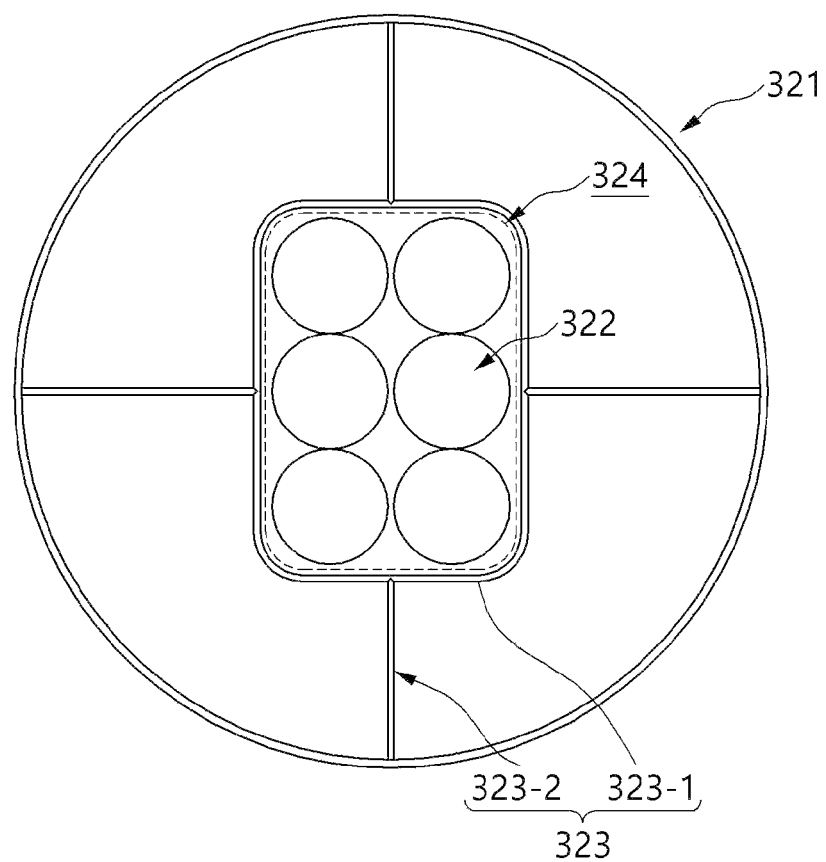

[FIG. 7]
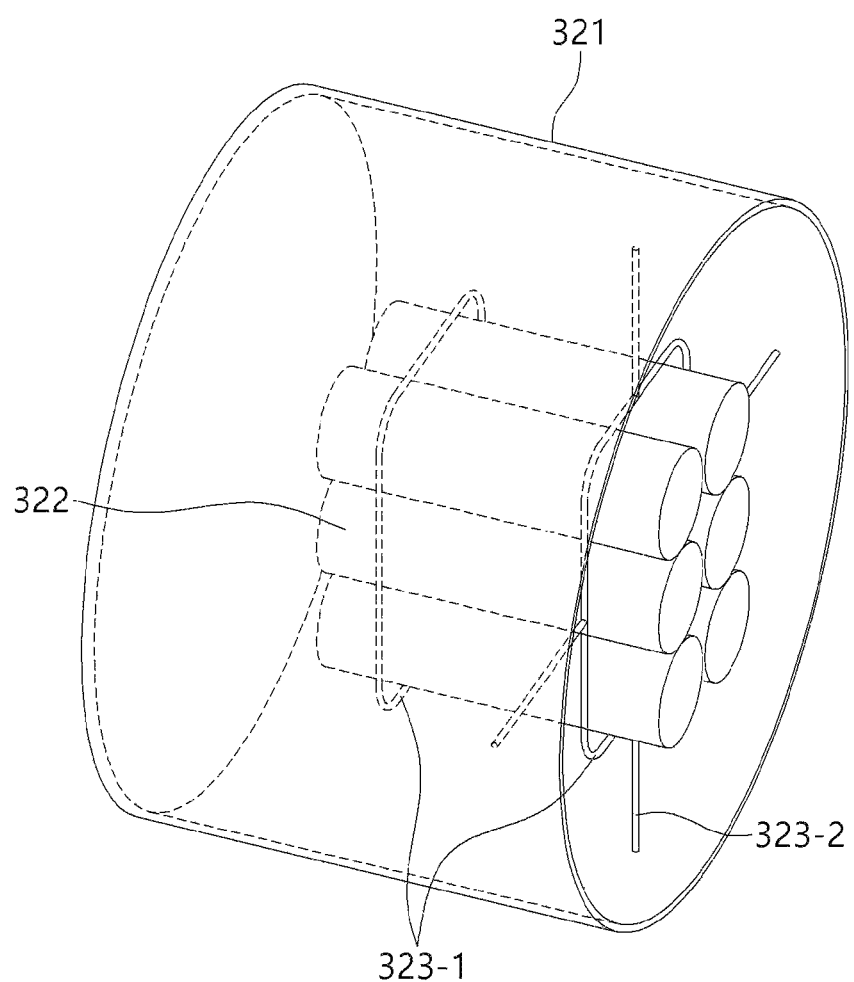

HIGH-EFFICIENCY CORDLESS HAIR DRYER

CROSS REFERENCE TO RELATED APPLICATIONS

This application is a U.S. National Stage Application of International Application No. PCT/KR2020/001660, filed on Feb. 5, 2020, which claims the benefit under 35 USC 119(a) and 365(b) of Korean Patent Application No. 10-2019-0161954, filed on Dec. 6, 2019, in the Korean Intellectual Property Office, the entire disclosure of which is incorporated herein by reference for all purposes.

TECHNICAL FIELD

The present invention relates to a high-efficiency cordless hair dryer, and more particularly, to a high-efficiency cordless hair dryer, in which a power supply module is mounted at a rear side of a main body housing, and a battery is disposed in a direction of a flow of air, such that the battery may be prevented from being heated, thereby improving safety of use.

BACKGROUND ART

In general, a hair dryer refers to an electronic device used to dry moist hair with cool or hot air and uses the principle of drying hair by accelerating evaporation of water particles attached to the hair.

Most of the hair dryers in the related art are wired hair dryers with power plugs connected to power terminals. A cordless hair dryer has been developed for convenience of use, and the cordless hair dryer uses a battery. Therefore, it is important to ensure efficiency and safety of the battery. In particular, because excessive heat may be generated from the battery, studies are being conducted on a structure for arranging the battery.

In addition, in the case of most of the currently known cordless hair dryers, a battery is disposed in a handle of the dryer, because it is convenient to place the battery in the handle in consideration of the structure of the dryer. However, this structure may cause problems in that a user's hand may be burned by heat generated and transferred from the battery and the hair dryer may be damaged due to the heat generated from the battery.

For example, the cordless hair dryer, which is commercially available, is designed such that power consumption is 1,000 W at 10 V. In this case, if a high current of about 80 A is discharged, for example, there may be a remarkably high risk that an accident occurs as the battery is overheated. For example, in a case in which a high-output battery with highest performance is discharged at 20 A, a temperature of a surface of the battery is rapidly raised up to approximately 80° C. In this case, it can be assumed that the battery disposed in the handle may cause a great danger.

Accordingly, there is a need for development of a cordless hair dryer having a new structure capable of inhibiting overheating of the battery to enable stable use, and using heat emitted from the battery to heat air, thereby improving efficiency of a drying process.

As the related art, there is U.S. Patent Application Laid-Open No. US2018/0031318A1. This patent application discloses a configuration in which a battery is mounted in a handle part.

DISCLOSURE

Technical Problem

An exemplary embodiment of the present invention provides a high-efficiency cordless hair dryer, in which a power supply module is mounted at a rear side of a main body housing, and a battery is disposed in a direction of a flow of air, such that the battery may be prevented from being heated, safety of use may thus be improved, and air used to cool the battery may be heated, thereby improving efficiency of a drying process.

Technical Solution

A high-efficiency cordless hair dryer according to an exemplary embodiment of the present invention may include: a main body housing having, at a rear side thereof, an air inlet port through which air is introduced, having, at a front side thereof, a discharge port through which the air is discharged, and having an internal space in which a heating element is mounted; and a power supply module configured to supply power and detachably coupled to the rear side of the main body housing at which the air inlet port is formed, in which the power supply module is detachably coupled to the main body housing so as to be coincident with a direction of a flow of air in the main body housing.

In addition, the power supply module according to the exemplary embodiment of the present invention may include: a battery mounting body including a plurality of battery mounting members disposed in a circumferential direction in a movement passage for air and configured such that a plurality of batteries is detachably coupled to the plurality of battery mounting members, respectively; and a module plate coupled to a rear side of the battery mounting body and mounted with a switch member for turning on/off the batteries or a remaining power level display member for indicating a remaining power level.

In addition, the power supply module according to the exemplary embodiment of the present invention may further include a thermally conductive thin film disposed along an inner surface of the battery mounting body and configured to dissipate heat generated from the batteries.

In addition, the battery mounting member according to the exemplary embodiment of the present invention may have a "⊏" cross-sectional shape or a semicircular cross-sectional shape and configured such that the battery is coupled to or separated from the battery mounting member, and a conductive thin film may be formed along an inner surface of the battery mounting member.

In addition, the battery according to the exemplary embodiment of the present invention may be fixed, by silicone, to a groove formed in the battery mounting member.

In addition, according to the exemplary embodiment of the present invention, a capacity of the battery or the number of batteries and the number of battery mounting members may be selectively determined in accordance with the amount of required power.

In addition, the battery according to the exemplary embodiment of the present invention may be disposed such that a longitudinal direction of the battery is coincident with or perpendicular to the direction of the flow of air.

In addition, the power supply module according to the exemplary embodiment of the present invention may be configured as a pouch type and detachably coupled to the rear side of the main body housing.

In addition, the module plate according to the exemplary embodiment of the present invention may have a charging terminal for charging the battery.

In addition, the power supply module according to the exemplary embodiment of the present invention may further include at least one filter disposed in front of or behind the battery mounting body.

In addition, the high-efficiency cordless hair dryer according to the exemplary embodiment of the present invention may further include a suction fan configured to suck air into the internal space of the main body housing, in which the suction fan is disposed between the module plate and the internal space of the main body housing or the battery mounting body.

In addition, the high-efficiency cordless hair dryer according to the exemplary embodiment of the present invention may further include a handle part mounted at a lower end of the main body housing and having an operation adjustment unit, in which the operation adjustment unit is adjustable after the switch member is turned on.

Advantageous Effects

According to the exemplary embodiment of the present invention, the power supply module is mounted at the rear side of the main body housing, and the battery is disposed in the direction of a flow of air, such that the battery may be prevented from being heated, safety of use may thus be improved, and air used to cool the battery may be heated, thereby improving efficiency of the drying process.

DESCRIPTION OF DRAWINGS

FIG. 1 is a view illustrating a schematic configuration of a high-efficiency cordless hair dryer according to an exemplary embodiment of the present invention.

FIG. 2 is a view illustrating a power supply module detachably coupled to a main body housing illustrated in FIG. 1.

FIG. 3 is a modified example of FIG. 2.

FIG. 4 is a view illustrating a cross section taken along line A-A in FIG. 2.

FIG. 5 is a view illustrating a configuration of a power supply module of a high-efficiency cordless hair dryer according to another exemplary embodiment of the present invention.

FIG. 6 is a top plan view illustrating a configuration of a power supply module of a high-efficiency cordless hair dryer according to still another exemplary embodiment of the present invention.

FIG. 7 is a perspective view illustrating the configuration of the power supply module of the high-efficiency cordless hair dryer according to still another exemplary embodiment of the present invention.

DESCRIPTION OF MAIN REFERENCE NUMERALS OF DRAWINGS

100: High-efficiency cordless hair dryer
110: Main body housing
110S: Internal space of main body housing
111: Heating element
113: Air inlet port
115: Discharge port
120: Power supply module
121: Battery mounting body
122: Battery
123: Battery mounting member
124: Thermally conductive thin film
125: Module plate
126: Switch member
127: Remaining power level display member
128: Charging terminal
130: Handle part
131: Operation adjustment unit
132: On/off switch
133: Hot air adjustment member
134: Cool air button
140: Suction fan
150: Filter
220: Power supply module
221: Battery mounting body
222: Battery
223: Battery mounting member
224: Conductive thin film

BEST MODE

Advantages and/or features of the present invention and methods of achieving the advantages and features will be clear with reference to exemplary embodiments described in detail below together with the accompanying drawings. However, the present invention is not limited to the exemplary embodiments disclosed herein but will be implemented in various forms. The exemplary embodiments of the present invention are provided so that the present invention is completely disclosed, and a person with ordinary skill in the art can fully understand the scope of the present invention. The present invention will be defined only by the scope of the appended claims. Like reference numerals indicate like constituent elements throughout the specification.

Hereinafter, exemplary embodiments of the present invention will be described in detail with reference to the accompanying drawings.

FIG. 1 is a view illustrating a schematic configuration of a high-efficiency cordless hair dryer according to an exemplary embodiment of the present invention, FIG. 2 is a view illustrating a power supply module detachably coupled to a main body housing illustrated in FIG. 1, FIG. 3 is a modified example of FIG. 2, and FIG. 4 is a view illustrating a cross section taken along line A-A in FIG. 2.

Referring to FIGS. 1 and 2, a high-efficiency cordless hair dryer 100 according to an exemplary embodiment of the present invention may include a main body housing 110, a power supply module 120 detachably coupled to the main body housing 110, a suction fan 140 configured to suck outside air into the main body housing 110, and a handle part 130 mounted on the main body housing 110 and configured to serve as a handle.

With this configuration, it is possible to efficiently remove moisture from a user's hair, for example, while preventing heat generation caused by use of a battery, thereby improving safety of use.

Each configuration will be described. First, the main body housing 110 according to the present exemplary embodiment defines a basic external appearance and has an internal space 110S. An air inlet port 113 may be formed at a rear side of the main body housing 110, and a discharge port 115 through which cool air or hot air is discharged may be formed at a front side of the main body housing 110. Although not illustrated, a cover (not illustrated) may be coupled to the discharge port 115 of the main body housing 110, and an expanded flow of air may be provided through the cover.

Referring to FIG. 1, a heating element 111 may be disposed in the internal space 110S of the main body housing 110 so as to be adjacent to the discharge port 115. The heating element 111 may be operated by power provided from the power supply module 120 to be described below and may heat air passing through the heating element 111, such that a flow of air having an adjusted temperature may be provided through the discharge port 115.

For example, the heating element 111 may be configured in the form of a spiral coil having a tube shape, but the present invention is not limited thereto, and other types of heating elements 111 may be used.

Meanwhile, as described above, in the case of a cordless hair dryer in the related art, a module for supplying power is provided in a handle, which causes a problem in that a user is injured due to heat generated when the battery operates.

Therefore, in the present exemplary embodiment, the power supply module 120 is detachably coupled to the main body housing 110, such that a structure for mounting and separating the power supply module 120 is simplified. Further, the amount of heat, which may be generated from the power supply module 120, may be minimized, and the generated heat may be used, such that the high-efficiency cordless hair dryer according to the present invention is more efficient and stable than that in the related art.

As illustrated in FIGS. 1, 2, and 4, the power supply module 120 according to the present exemplary embodiment may include: a battery mounting body 121 having a plurality of battery mounting members 123 disposed in a circumferential direction and configured such that batteries 122 are detachably coupled to the plurality of battery mounting members 123, respectively; and a module plate 125 coupled to a rear side of the battery mounting body 121. In the exemplary embodiment of the present invention, the batteries 122 are disposed in the circumferential direction, but the present invention is not limited thereto, and the batteries 122 may be disposed in a movement passage for air.

First, as illustrated in FIG. 1, the battery mounting body 121 has a hollow cylindrical shape corresponding to the shape of the internal space 110S of the main body housing 110, and the plurality of battery mounting members 123 is provided on an inner surface of the battery mounting body 121.

Referring to FIGS. 1 and 2, a total of six battery mounting members 123 may be provided on the battery mounting body 121, and the batteries 122 may be mounted on the battery mounting members 123, respectively. As illustrated in FIG. 4, the battery mounting member 123 may have a schematically "└" shape closed (outward) at a lower side thereof, and the battery 122 may be mounted in a groove formed in the battery mounting member 123. In this case, the battery 122 may be fixed to the battery mounting member 123 by means of silicone.

However, the number of batteries 122 and the number of battery mounting members 123 may be selectively determined in accordance with performance to be implemented by the hair dryer 100. FIGS. 1 and 2 illustrate a total of six battery mounting members 123 and the batteries 122 coupled to the battery mounting members 123, respectively. However, there may of course be provided more than six batteries 122 and more than six battery mounting members 123 in order to prepare for a case in which a larger amount of power is required. Likewise, a battery with a larger capacity may also be used as the battery 122, as necessary.

Referring to FIG. 4, the power supply module 120 according to the present exemplary embodiment may have a thermally conductive thin film 124 made of aluminum having high thermal conductivity, for example, disposed along the inner surface of the battery mounting body 121, and configured to dissipate heat generated from the batteries 122.

In particular, as described above, the battery mounting member 123 has a "┌" shape. The conductive thin film 124 is also formed along inner surfaces of the battery mounting members 123, such that the heat generated from the batteries 122 may be appropriately dissipated from a center of the battery mounting body 121 along the thermally conductive thin film 124.

As can be seen from FIG. 4, the conductive thin film 124 mounted on the battery mounting members 123 has a separation space to some extent from the batteries 122, such that outside air may be appropriately transmitted to the batteries 122, the heat generated from the batteries 122 may be appropriately dissipated through the conductive thin film 124, and thus the batteries 122 may be more quickly cooled.

With the arrangement structure and the configuration of the power supply module 120, it is possible to prevent the batteries 122 from being overheated and to efficiently used the heat generated from the batteries 122.

In addition, when the high-efficiency cordless hair dryer 100 according to the present exemplary embodiment operates as described above, the outside air may be introduced, by the suction fan 140, into the internal space 110S of the main body housing 110 via the power supply module 120, heated by the heating element 111, and then provided to the user's hair and the like.

In this case, the batteries 122 may be heated due to the use of the batteries 122 or an influence of the heating element 111, but the amount of heat generated from the batteries 122 may be minimized by the outside air because the outside air is introduced into the power supply module 120, as described above. In addition, the heat generated from the batteries 122 is dissipated through the thermally conductive thin film 124, and the dissipated heat is provided to the air directed toward the main body housing 110, such that the air may be heated.

Meanwhile, as illustrated in FIGS. 1 and 2, the module plate 125 according to the present exemplary embodiment is coupled to the rear side of the battery mounting body 121 and may include a switch member 126 for turning on/off the batteries 122, a remaining power level display member 127 for indicating a remaining power level of the batteries 122, and a charging terminal 128 for charging the batteries 122.

The switch member 126 may be provided in various forms, but because the high-efficiency cordless hair dryer 100 is often carried by the user, the switch member 126 may be configured to turn on/off the batteries while sliding. However, the present invention is not limited thereto, and the switch member 126 may of course be configured as a touch type, a button type, or the like.

Since the remaining power level display member 127 indicates the remaining power level of the batteries 122, the user may check the remaining power level of the batteries 122 and charge the batteries 122 by using the charging terminal 128. The charging terminal 128 may be provided in accordance with several standards, and thus the hair dryer 100 according to the present exemplary embodiment may be charged by a portable auxiliary battery.

Meanwhile, the handle part 130 according to the present exemplary embodiment is mounted at a lower end of the main body housing 110 and may include an operation adjustment unit 131 including an on/off switch 132 for operating the hair dryer 100, an adjustment member 133 for adjusting intensity of hot air, and a cool air button 134 for generating cool air.

Because the operation adjustment unit 131 of the handle part 130 may be unintentionally pushed when the user carries the hair dryer 100 in a bag or the like as described above, the operation adjustment unit 131 according to the present exemplary embodiment may operate in conjunction with the switch member 126 provided on the module plate 125. In other words, an instruction for operating the operation adjustment unit 131 may be executed only after the batteries 122 are turned on by the switch member 126.

Meanwhile, as illustrated in FIG. 2, the power supply module 120 according to the present exemplary embodiment may include filters 150 disposed in front of and behind the battery mounting body 121. The filters 150 may filter the air to be introduced into the hair dryer 100 according to the present exemplary embodiment, thereby providing clean air to the user's hair or the like.

In the present exemplary embodiment, the filters are provided in front of and behind the battery mounting body 121, one by one, respectively, such that the operation of filtering the air may be repeatedly performed, thereby providing clean air to the user.

In addition, referring to FIG. 2, in the present exemplary embodiment, the suction fan 140 may be provided in the internal space 110S of the main body housing 110, particularly, between the heating element 111 and the filter. The suction fan 140 may also be operated by power provided from the power supply module 120, and the outside air may be introduced into the main body housing 110 via the power supply module 120 when the suction fan 140 operates.

In this case, as described above, the introduced air may cool the heated batteries 122 to some extent, and the heat generated from the batteries 122 may heat the air. Therefore, because the battery 122 is not mounted in the handle part 130 unlike the related art, it is possible to completely prevent the handle part 130 from being heated, and the outside air may prevent the battery 122 from being heated despite the structure in which the handle part 130 is coupled to the main body housing 110, thereby preventing the entire hair dryer 100 from being heated.

Meanwhile, as illustrated in FIG. 2, the suction fan 140 may be mounted in the main body housing 110, but as illustrated in FIG. 3, the suction fan 140 may be mounted in the power supply module 120. In other words, the suction fan 140a may be disposed between the battery mounting body 121 and the filter 150 at the rear side. In this case, the suction fan 140a may be closer to the outside, thereby more strongly sucking the outside air.

Meanwhile, the following table shows temperatures of a surface of the battery 122 with respect to velocities of air introduced into the hair dryer 100 according to the present exemplary embodiment.

TABLE 1

| Air Velocity (m/s) | 0 | 12 | 18 |
|---|---|---|---|
| Discharge Current (20 A) | 90° C. | 50° C. | 45° C. |
| Discharge Current (15 A) | 48° C. | 36° C. | 32° C. |

It can be seen from the table that the temperature of the surface of the battery decreases when the velocity of air is high, and it can be ascertained that the temperature of the surface of the battery less increases when a discharge current is low. According to the exemplary embodiment of the present invention as described above, the power supply module 120 is mounted at the rear side of the main body housing 110, and the battery 122 is disposed in the direction of a flow of air, such that the battery 122 may be prevented from being heated, safety of use may thus be improved, and air used to cool the battery 122 may be heated, thereby improving efficiency of the drying process.

Meanwhile, a configuration of a hair dryer according to another exemplary embodiment of the present invention will be described, and a description of parts substantially identical to the parts of the above-mentioned exemplary embodiment will be omitted.

FIG. 5 is a view illustrating a configuration of a power supply module of a high-efficiency cordless hair dryer according to another exemplary embodiment of the present invention.

As illustrated, a power supply module 220 according to the present exemplary embodiment includes a battery mounting body 221, and a groove of each of a plurality of battery mounting members 223 provided on the battery mounting body 221 may have a semicircular shape corresponding to a shape of a battery 222. In this case, since the shape of the groove of the battery mounting member 223 corresponds to the shape of the battery 222, the battery 222 may be more stably mounted.

In addition, a conductive thin film 224 is mounted along inner surfaces of the battery mounting members 223, such that the heat generated from the batteries 222 may be dissipated to the outside through the conductive thin film 224, thereby improving efficiency in cooling the batteries 222.

FIG. 6 is a top plan view illustrating a configuration of a power supply module of a high-efficiency cordless hair dryer according to still another exemplary embodiment of the present invention, and FIG. 7 is a perspective view illustrating the configuration of the power supply module of the high-efficiency cordless hair dryer according to still another exemplary embodiment of the present invention.

As illustrated in FIGS. 6 and 7, a power supply module 320 according to the present exemplary embodiment includes a battery mounting body 321. A plurality of battery mounting members 323 provided on the battery mounting body 321 may have one or more holders 323-1 configured to surround a battery pack including a plurality of batteries 322, and a support 323-2 configured to fix the body to the battery mounting body 321.

As illustrated in FIG. 7, the support 323-2 may fix the plurality of batteries 322 so that the plurality of batteries 322 is disposed at a center of the battery mounting body 321.

In addition, a conductive thin film 324 is mounted along inner surfaces of the holders 323-1 of the battery mounting members 323, such that the heat generated from the batteries 322 may be dissipated to the outside through the conductive thin film 324, thereby improving efficiency in cooling the batteries 322.

In the above-mentioned exemplary embodiments and the drawings, the case in which the plurality of batteries is disposed in the direction corresponding to the direction of the flow of air has been described above, but the present invention is not limited thereto, and the batteries may of course be disposed in a direction perpendicular to the direction of the flow of air or disposed to be inclined.

Meanwhile, in the above-mentioned exemplary embodiments, the power supply module has been described as having the structure attachable to and detachable from the main body housing, but the present invention is not limited thereto, and the power supply module may be configured as a pouch type and detachably coupled to the rear side of the main body housing.

While the specific exemplary embodiments according to the present invention have been described above, various modifications may be made without departing from the scope of the present invention. Therefore, the scope of the present invention should not be limited to the described exemplary embodiments and should be defined by not only the claims to be described below, but also those equivalent to the claims.

While the present invention has been described above with reference to the limited exemplary embodiments and the drawings, the present invention is not limited to the exemplary embodiments and may be variously modified and altered from the disclosure by those skilled in the art to which the present invention pertains. Therefore, the spirit of the present invention should be defined only by the appended claims, and all modifications, equivalents, and alternatives fall within the scope and spirit of the present invention.

The invention claimed is:

1. A high-efficiency cordless hair dryer comprising:
a main body housing having, at a rear side thereof, an air inlet port through which air is introduced, having, at a front side thereof, a discharge port through which the air is discharged, and having an internal space in which a heating element is mounted; and
a power supply module, including a plurality of batteries, configured to supply power and detachably coupled to the rear side of the main body housing at which the air inlet port is formed,
wherein the power supply module is detachably coupled to the main body housing so as to be coincident with a direction of a flow of air in the main body housing, and
wherein the plurality of batteries is located between air filters disposed inside of the main body housing,
wherein the power supply module comprises:
a battery mounting body comprising a plurality of battery mounting members disposed in a circumferential direction in a movement passage for air and configured such that the plurality of batteries is detachably coupled to the plurality of battery mounting members, respectively; and
a module plate coupled to a rear side of the battery mounting body and mounted with a switch member for turning on/off the plurality of batteries or a remaining power level display member for indicating a remaining power level, and
wherein the power supply module further comprises a first filter of the air filters, disposed in front of the battery mounting body and a second filter, of the air filters, disposed behind the battery mounting body.

2. The high-efficiency cordless hair dryer of claim 1, wherein the power supply module further comprises a thermally conductive film disposed along an inner surface of the battery mounting body and configured to dissipate heat generated from the plurality of batteries.

3. The high-efficiency cordless hair dryer of claim 1, wherein the battery mounting member has a "⊏" cross-sectional shape or a semicircular cross-sectional shape and configured such that the battery is coupled to or separated from the battery mounting member, and a conductive film is formed along an inner surface of the battery mounting member.

4. The high-efficiency cordless hair dryer of claim 3, wherein the battery is fixed, by silicone, to a groove formed in the battery mounting member.

5. The high-efficiency cordless hair dryer of claim 1, wherein a capacity of a battery of the plurality of batteries or the number of the plurality of batteries and the number of battery mounting members are selectively determined in accordance with an amount of required power.

6. The high-efficiency cordless hair dryer of claim 1, wherein a battery, of the plurality of batteries, is disposed such that a longitudinal direction of the battery is coincident with or perpendicular to the direction of the flow of air.

7. The high-efficiency cordless hair dryer of claim 1, wherein the power supply module is configured as a pouch type and detachably coupled to the rear side of the main body housing.

8. The high-efficiency cordless hair dryer of claim 1, wherein the module plate has a charging terminal for charging the battery.

9. The high-efficiency cordless hair dryer of claim 1, further comprising:
a suction fan configured to suck air into the internal space of the main body housing,
wherein the suction fan is disposed between the module plate and the internal space of the main body housing or the battery mounting body.

10. The high-efficiency cordless hair dryer of claim 1, further comprising:
a handle part mounted at a lower end of the main body housing and having an operation adjustment unit,
wherein the operation adjustment unit is adjustable after the switch member is turned on.

* * * * *